United States Patent [19]

Julian et al.

[11] 4,325,668

[45] Apr. 20, 1982

[54] POWERED PLATFORM LIFT SYSTEM FOR PERSONS IN WHEELCHAIRS

[75] Inventors: Ernest L. Julian, Tustin; Phyllis S. Gaylard, Huntington Beach, both of Calif.

[73] Assignee: Pinetree Service Corporation, Westminister, Calif.

[21] Appl. No.: 943,477

[22] Filed: Sep. 18, 1978

[51] Int. Cl.[3] .......... B60P 1/00

[52] U.S. Cl. .......... 414/546; 414/917; 414/921

[58] Field of Search .......... 414/406, 546–550, 414/555–558, 917, 921, 628–632, 681; 187/8.52, 9 R, 97, 8.71; 74/43, 51, 53, 69; 248/420–421; 105/443, 447, 449

[56] References Cited

U.S. PATENT DOCUMENTS

| | | | |
|---|---|---|---|
| 2,126,289 | 8/1938 | Schroeder | 414/631 |
| 2,181,881 | 12/1939 | Ferris | 414/917 |
| 2,702,606 | 2/1955 | Young | 187/8.52 |
| 2,733,825 | 2/1956 | Evans | 414/629 |
| 3,233,767 | 2/1966 | Goodacre | 187/8.52 |
| 3,913,759 | 10/1975 | Deacon | 414/917 |
| 4,029,223 | 6/1977 | Adamski et al. | 414/546 |
| 4,058,228 | 11/1977 | Hall | 414/549 |
| 4,124,098 | 11/1978 | Dudynskyj | 414/546 |
| 4,134,504 | 1/1979 | Sales et al. | 414/921 |

FOREIGN PATENT DOCUMENTS

| | | | |
|---|---|---|---|
| 2246821 | 3/1974 | Fed. Rep. of Germany | 414/557 |
| 1229575 | 9/1960 | France | 414/557 |
| 640885 | 8/1950 | United Kingdom | 414/557 |

*Primary Examiner*—Trygve M. Blix
*Assistant Examiner*—R. B. Johnson
*Attorney, Agent, or Firm*—Christie, Parker & Hale

[57] ABSTRACT

A wheelchair boarding system for buses and vans utilizing a cantilevered platform having an arcuate path of motion between a storage position inside the vehicle and a grounded position outside the vehicle. The platform is extended and retracted by a parallel bar linkage and track system driven by an electric motor and chain drive linkage. Provision is made for securing the wheelchair on the platform and for safeguarding the area around the lift system in the interior of the vehicle when the platform is in its extended position. Master controls are provided at the driver's console, and lift controls are located in an exterior panel on the vehicle adjacent the door to the lift system.

7 Claims, 7 Drawing Figures

12
84
82
86
32
70
88
74
90
34
80
72
52
92
56
48
94
100
98
96
102
76
36
104

POWERED PLATFORM LIFT SYSTEM FOR PERSONS IN WHEELCHAIRS

BACKGROUND OF THE INVENTION

The present invention relates to platform lift systems and, in particular, a wheelchair lift system integrated into a vehicle, such as a bus.

As the categorization of prior art to be listed below will testify, there are a number of forms of lifting and lowering mechanisms which have been designed specifically for the purpose of assisting persons confined to wheelchairs to enter and alight from vehicles, such as passenger automobiles, buses, and the like. A number of prior art devices have been designed which vary from relatively simple designs, which provide for only a single vector of motion, to those which offer a combination of motions to accomplish the purpose. One approach which has been taken by the prior art is the use of a lever or boom assembly which is attached to the roof of the vehicle and provided with suitable means for extending and retracting the boom from the interior to the exterior of the vehicle and further providing the boom assembly with means for being connected to the wheelchair to lift it into and out of the vehicle. Representative of such approaches are the assemblies which are described and illustrated in U.S. Pat. Nos. 3,656,637; 3.910,432; and 3,957,164.

Mechanisms of the foregoing type are unsatisfactory for use for the reason that they are inconvenient and time-consuming because of the problems inherent in connecting lines, hooks, and the like suspended from the boom assembly to the chair. Such mechanisms are acceptable in some instances, for instance, when used with passenger car vehicles where time considerations are not as significant, and where cost factors are such that a more elaborate and convenient mechanism is prohibitively expensive. Such methods are, however, unsatisfactory, particularly when used in common carrier-type vehicles, such as buses. In addition, overhead lifting mechanisms of this type are subject to swaying and swinging during their operation, thus giving the wheelchair passenger a very insecure feeling and, in extreme cases, threatening to either drop the chair or dump the occupant from his vehicle.

The present invention provides an alternative to boom assembly lift systems by providing a powered platform lift assembly which is integrated into a vehicle, such as a bus, and moves the wheelchair passenger in a completely safe and secure manner from a position inside the vehicle to the ground outside.

Powered platform lifting mechanisms are also known in the prior art. Innumerable tailgate truck lift mechanisms have been provided for the purpose of removing and loading extremely heavy items from the bed of a truck on which they are carried to the ground or to a dock or loading platform which is below the bed of the truck. Mechanisms of this type frequently use linkages, and track guidance systems associated with the linkages, for guiding the platform or other object to be lifted from one elevation to another. Representative of such powered lifting systems are the devices shown in U.S. Pat. Nos. 3,067,966 and 3,351,220. Such mechanisms are adapted and designed for specific lifting purposes and are not suited to the object of providing a quick, safe, convenient, and completely secure system for enabling persons in a wheelchair to enter and leave common carrier vehicles, such as buses.

SUMMARY OF THE PRESENT INVENTION

The present invention provides a powered platform lifting system for wheelchair passengers, which is full integrated into the structure of a common carrier, such as a bus, and provides at the same time a safe, secure, quick, and comfortable mode of motion for the passenger. In its retracted position, the platform on which the wheelchair passenger is transported forms a part of the floor of the bus and, after a passenger is loaded thereon, is capable of quickly, safely, and securely lowering the passenger to the ground outside the bus under the control of an operator. The path of motion described by the platform is arcuate or ramp-like and includes compound motions combining outward and downward motions in the extension phase and inward and upward motions in the retraction phase.

More specifically, the invention provides a wheelchair lifting mechanism which comprises a housing and guide means mounted within the housing. A linkage is mounted on the guide means, and a wheelchair platform is supported by the linkage. Chocking means are provided on the platform located so as to brace the wheels of a wheelchair while the platform is in motion. Finally, drive means are provided for extending and retracting the platform, whereby the platform traces an outward and downward motion during extension, and the reverse of said motion during retraction.

Among other features, the present invention provides a powered platform lift system which consists of a main platform and a ramp extending outwardly from the platform which is hinged to the main platform for ease of stowage. The platform assembly is mounted on a parallel bar linkage system which includes guiding tracks. The linkage and track system provides an arcuate mode of motion for the platform between the interior of the bus and ground, while at the same time maintaining the platform completely level. The linkage is powered by a DC electric motor which is geared down to a comfortable rate of travel and linked to the linkage and track system by means of a chain drive. The linkage is mounted on the track system by means of rollers positioned at the linkage pivot points, and the rollers are positioned and adapted to ride on pairs of tracks of the track system. A handrail is located on the door of the vehicle to be held by the passenger while ascending or descending. Two auxiliary panels, normally flush-mounted on the main platform, are movable between a raised and flush position and are utilized as a pair of chocks around the rear wheels of the chair for security. The auxiliary ramp at the leading edge of the main platform is pivotable from a position horizontal with the platform to an upwardly-angled position to provide further security for the front wheels of the wheelchair.

DESCRIPTION OF THE DRAWINGS

These and other advantages of the invention will be better understood by reference to the figures of the drawing, wherein.

DESCRIPTION OF THE SPECIFIC EMBODIMENT

Figure 1:
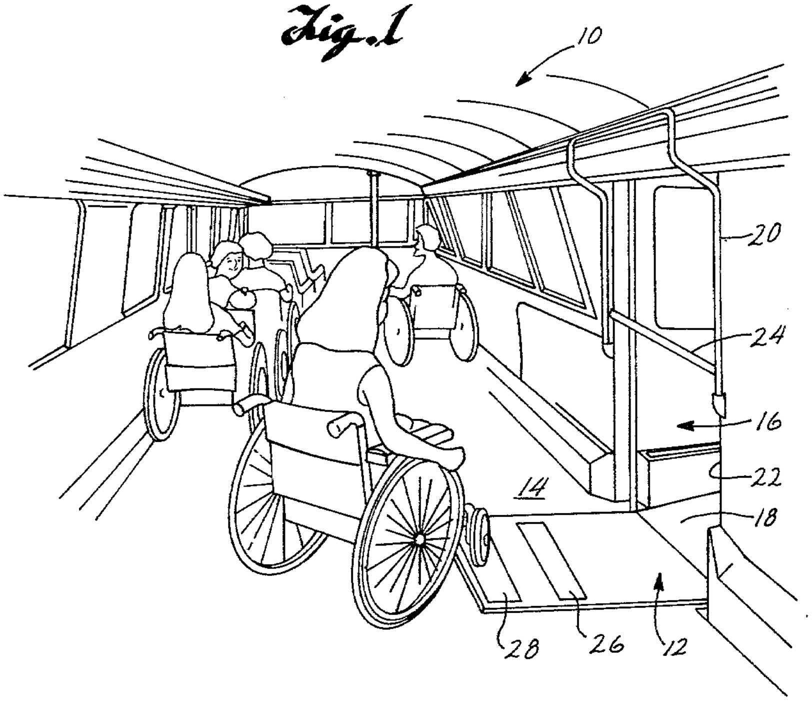
FIG. 1 is a view of the interior of a bus equipped with the platform lift system of the present invention.

A platform lift system according to the present invention is shown in FIG. 1 as it is installed in the interior of a bus 10 in position to discharge wheelchair passengers from the side of the bus. The main platform 12 of the lift system is shown in the retracted position flush with the floor 14 of the bus. An exterior door 16, which provides access to the lift system from the exterior of the bus, is shown in the open position. A pivotable ramp 18 extends outwardly and slightly upwardly from main platform 12. A shaft mounts ramp 18 which is ratcheted between stowed, horizontal and chocking positions by a releasing lever 68.

A safing rail 20 is hinged at approximately the midpoint of the doorway opening 22 and, in the stowed position, is swung upwardly and lies flat against the interior of the bus. A handrail 24 is attached to door 16 and extends downwardly and outwardly along the interior of the door to provide a handhold for a wheelchair passenger on the platform and an added feeling of security as he rides the lift platform into and out of the vehicle.

As is seen from FIG. 2, and as is described below, the safing rail 20 swings down to a horizontal position surrounding the wheelchair passenger when he is in position on platform 12. When in position facing outwardly, front and rear panels 26, 28, which are mounted in platform 12 and which are hinged along adjacent axes transverse to the platform, are tilted upwardly to brace or chock the rear wheels of a wheelchair. Ramp 18, being inclined upwardly at approximately a 20° angle (FIG. 2), provides added bracing and chocking for the front wheels of the wheelchair.

As seen in FIG. 1, a wheelchair passenger is approaching the ramp and is guiding her wheelchair onto the platform. When she has positioned herself on the platform, the safing rail 20 is dropped to its horizontal position surrounding the passenger. An attendant stationed on the outside of the bus, by means of a control panel located on the exterior of the bus, sets the lift system into operation and thereby causes the system to swing outwardly and downwardly from the bus in an arcuate path of motion until the platform 12 reaches and rests upon the ground. The remaining passengers then exit from the bus in a similar manner.

Figure 3:
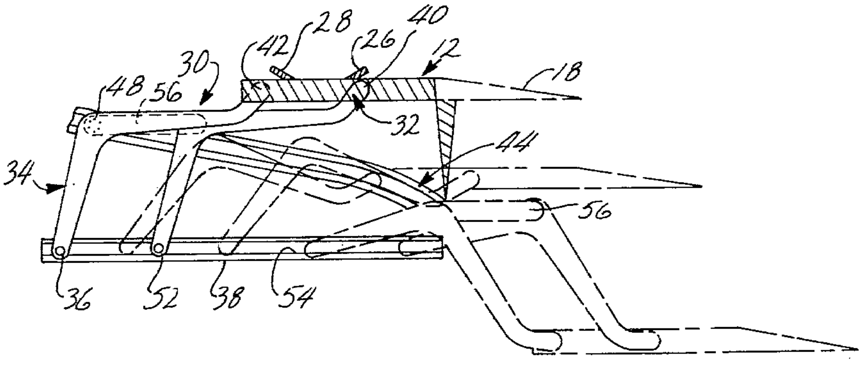
FIG. 3 is a sectional view in elevation showing the platform lift system of the present invention in the stowed position.
Figure 2:
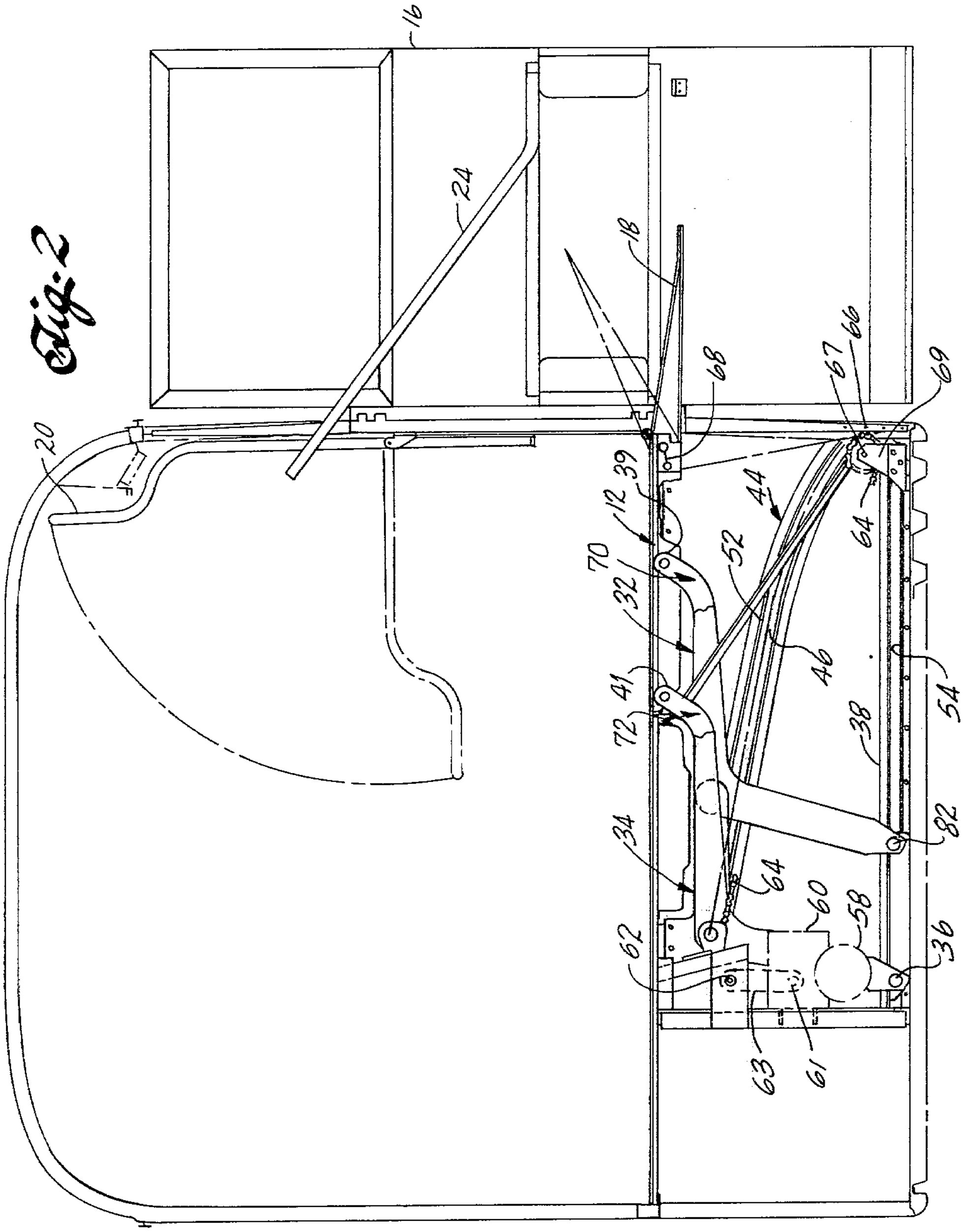
FIG. 2 is a side elevation view of the platform and supporting parallel bar linkage and track apparatus.
Figure 4:
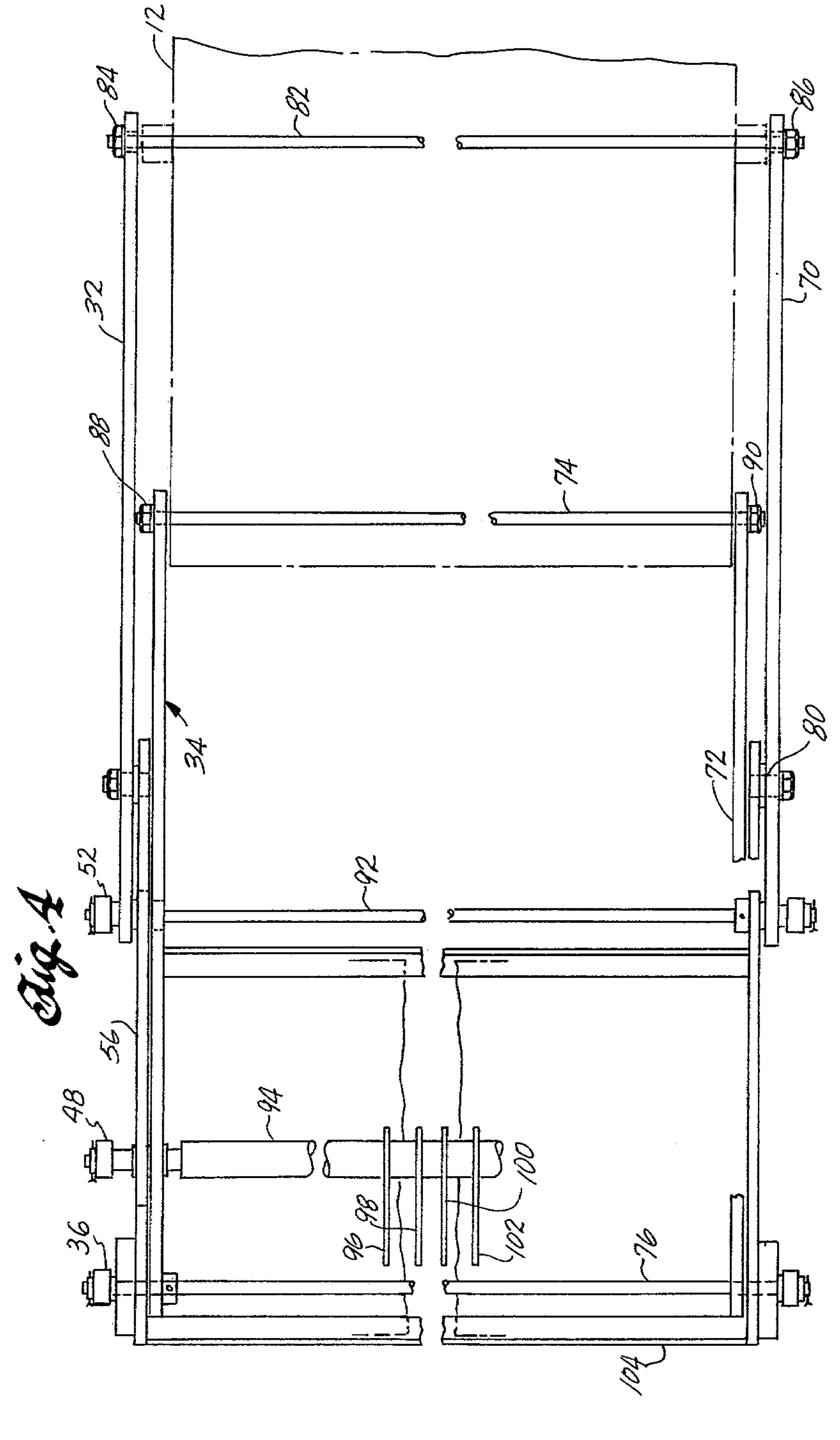
FIG. 4 is a top plan view of the parallel bar linkage assembly according to the present invention.
Figure 7:
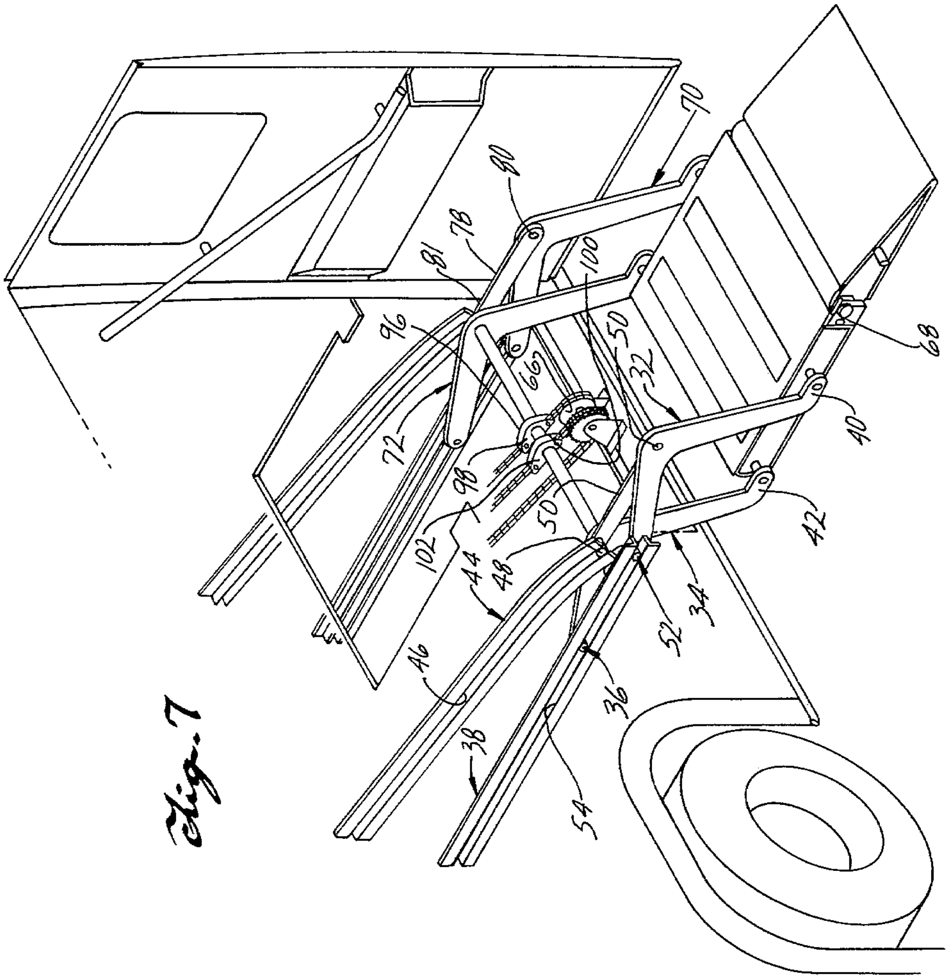
FIG. 7 is a perspective view of the platform and supporting parallel bar linkage and track apparatus of the present invention.

The drive system and the mechanical linkage for supporting the powered platform 12 is shown in FIGS. 2, 3, 4 and 7. As best seen in FIGS. 3 and 7, the basic mechanical support element for platform 12 is a pair of parallel bar linkages, each located at opposite sides of the platform and each comprising a pair of symmetrically-shaped platform support arms. The first pair comprises forward support arm 32 and rear support arm 34. A similar pair of platform support arms is located at the other side of the powered platform 12 and comprises forward support arm 70 and rear support arm 72. Each support arm is generally right-angled in configuration. Support arms 34, 32 are provided at their interior extremities with a roller and axle assembly 36 and 52, respectively, which ride in and are guided by a horizontal guide means, channel 54 on a horizontal track 38. The opposite extremity of each of the right-angle-shaped support arms 34, 32 are bent upwardly (in the stowed position of FIGS. 2 and 3) and are pivotally secured at the sides of platform 12. As seen in FIG. 3, forward support arm 32 has an upwardly-curved extremity 40, and rear platform support arm 34 has an upwardly-curved extremity 42. The horizontal shafts 74, 76, 82, 92 linking the support arms on each side of the platform are shown in FIG. 4 but are not shown in FIGS. 5 and 7 for clarity. Only the upwardly curved extremities of arms 70, 72 of the rearwardmost side parallel bar linkage are shown in FIG. 2. The remaining portion of arms 70, 72 are cut away for clarity to shown the balance of forward side arms 32, 34.

The final element one side of the parallel bar linkage and track support system for the platform is an arcuate guide means, curved track 44, which is also located at the side of platform 12 and has a channel 46 extending throughout its length for receiving a roller 48 mounted on the outside of rear platform support arm 34 at the knee of its right-angle configuration. A linking bar 56 is located between the exterior side of support arm 32 and the interior side of arm 34 and is pivotally connected between the knee of arm 32 and the knee of arm 34. The opposite side of the parallel bar linkage is seen in FIGS. 4 and 7 and described in conjunction with said figures of the drawing.

As is seen in FIG. 3, the motion of platform 12 from the stowed to the lowered position is depicted by showing three positions of the platform and the parallel bar linkage. As platform 12 is lowered to the ground, roller 48 moves along track element 44, and rollers 36 and 52 move along track element 38 in channel 54 to an exteriormost position wherein platform 12 is resting on the ground for discharge of the passenger on the platform. As can be seen in FIG. 3, in the stowed position the track elements and lower portions of the platform support arms define a geometric figure which is generally a parallelogram in configuration. In the fully extended position, the platform 12 and a linking bar 56, extending between the knee of the forward and rear platform support arms, together with the upper portions of each of the platform support arms, likewise define a geometric figure which is generally a parallelogram in configuration.

Mechanical drive for the platform lift system of the present invention is obtained by means of a DC electric motor 58, which is linked by means of a gearbox assembly 60 to a drive shaft 61. Shaft 61, in turn, is connected by means of a chain 63 to a sprocket mounted on shaft 62. The drive train is linked to the parallel bar linkage system by means of driven sprockets, also mounted on sprocket shaft 62, around which extends a driven chain 64. A second driven chain, not shown, similar in all respects to driven chain 64, is mounted on a second driven sprocket on shaft 62 adjacent the first sprocket. Driven chain 64 extends to a sprocket 66 located at the side of the bus adjacent the door opening. The drive motor, under the control of the operator at a control panel, through suitable gearing-down by means of gearbox 60, provides a slow, smooth, comfortable ride to cause the driven sprockets and chains to rotate in a first direction extending the platform outwardly and downwardly to the ground. Retraction is accomplished by operating an "up" button on the control panel, causing the electric motor 58 to rotate in the opposite direction and platform 12 to be lifted and retracted into the vehicle.

The stowable ramp portion 18 of the platform is shown in phantom in a horizontal position in FIG. 3. Also shown in FIG. 3 is the stowed position of ramp 18. In the stowed position, ramp 18 extends downwardly from the platform toward sprocket 66 and, when collapsed, is located within the interior of the bus so that door 16 can be closed. Similarly, ramp 18 is shown in FIG. 2 in a phantom position extending upwardly from the plane of platform 12 to illustrate the upwardly inclined position to which it is moved to chock the front wheels of a wheelchair while the wheelchair is being moved inwardly or outwardly from the vehicle. Movement of the ramp 18 between the positions shown in FIGS. 2 and 3 is accomplished manually, and, by means of releasing lever 68, ramp 18 is pivoted and locked in the selected position by means of a ratchet (not shown).

Further details of the parallel bar linkage system of the present invention are shown in the plan view of FIG. 4 and the perspective view of FIG. 7. As shown therein, a forward platform support arm 70 opposite arm 32 is positioned at the side of platform 12 opposite arm 32. A rear platform support arm 72 is shown in a broken illustration (in FIG. 4) extending between a shaft 74 located at the rear of platform 12 and a shaft 76 extending through the extremities of the rear platform support arms 34 and 72. A linking bar 78 is also shown in a broken illustration (in FIG. 4) extending between the knee of support arm 70 to the knee of support arm 72. Pin 80 pivotally connects bar 78 to arm 70 and shaft 76 pivotally connects bar 78 to arm 72. The linking bar 56 between the knees of support arm 32 and support arm 34 is shown in its entirety in FIG. 4 to illustrate this connection between the support arms.

The forward support arms 32, 70 are pivotally secured to the sides of platform 12 by means of a shaft 82 extending between the forward extremities of the forward support arms and through the understructure of the platform. The arms 32, 70 are retained on shaft 82 by means of nuts 84, 86. The forward extremities of the rear support arms are likewise pivotally secured to shaft 74 and retained thereon by means of nuts 88, 90 with shaft 74 passing through the understructure of the platform to provide a balancing attachment to the platform by the rear support arms. The rearward extremities of the forward support arms 32, 70 are linked by means of shaft 92, and the rearward extremities of the rear support arms 34, 72 are linked by means of shaft 76.

The parallel bar linkage system of the present invention is completed by driven shaft 94, which extends between the knees of the rear platform support arms 34 and 72. As indicated above, a pair of chains extend between the sprockets mounted on shaft 62 and sprocket 66. Sprocket 66 is located adjacent the doorway to the lift system and secured to the housing for the lift system by means of shaft 67 and mounting bracket 69. A similar sprocket is mounted adjacent to sprocket 66 on the rearwardmost side of shaft 94. The sprocket chains are connected to driven shaft 94 by means of link plates 96 and 98 which are connected in and bracket one chain, and link plates 100 and 102 which are connected in and bracket the other chain. Link plates 96, 98, 100, and 102 are rigidly affixed to shaft 94 to transmit the drive power from the electric drive motor, through the drive sprockets and driven sprockets, to the parallel bar linkage to extend and retract platform 12. The positioning and location of the driven sprockets on shaft 62 (not shown in FIG. 4) is interiorly of and between link plates 96, 98 and 100, 102, respectively. Also shown in FIG. 4 is the motor and gearbox mounting frame 104.

Figure 5:
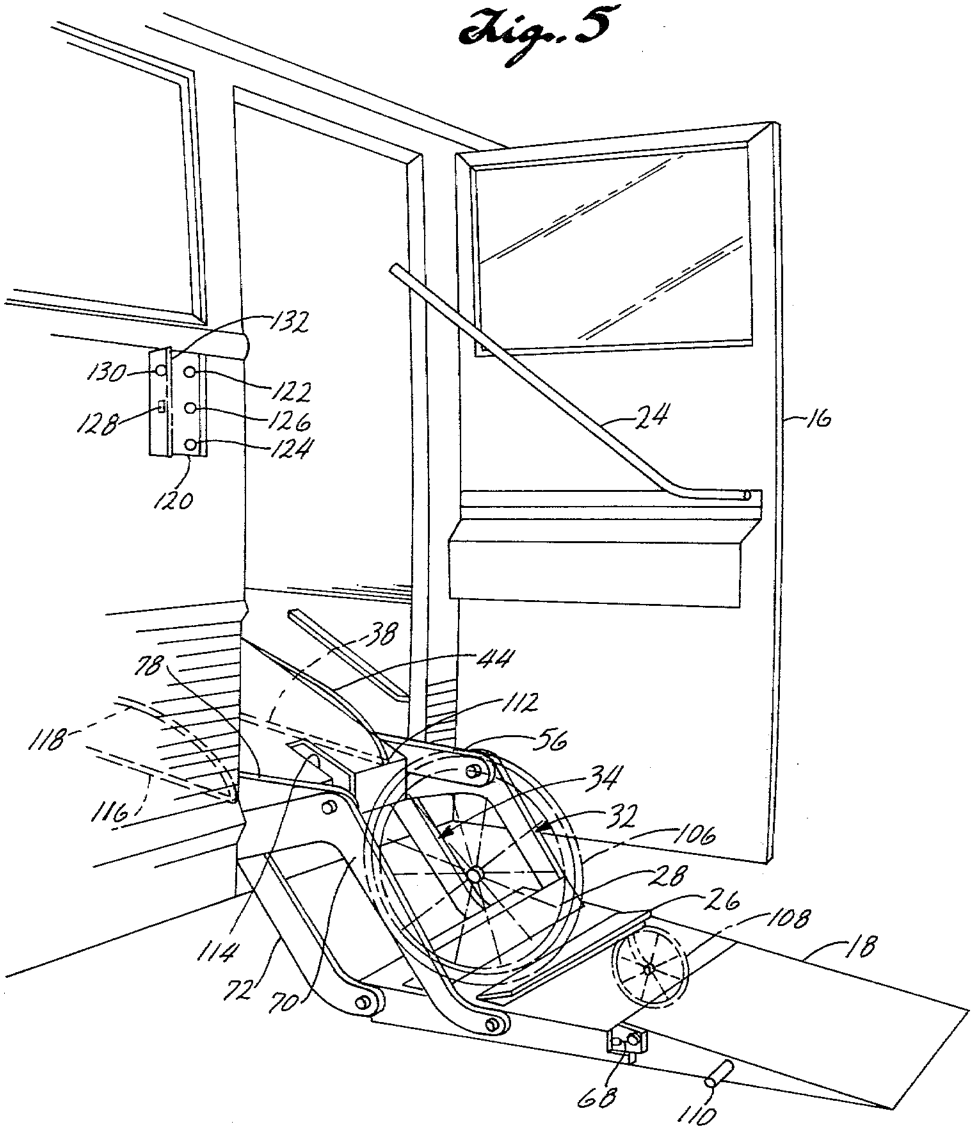
FIG. 5 is a view of the exterior of a bus with the platform lift system of the present invention in the extended or down position.

A view of the powered platform lifting system in the down position is shown in FIG. 5. As shown therein, the lift system is in a fully extended position with main platform 12 and ramp 18 resting flat on the ground. Shown in phantom is a large wheelchair wheel 106 and a smaller front wheel 108 in position on the main platform. Panels 26 and 28 are raised to lock the large rear wheel 106 in place, and front wheel 108 rests approximately on the line of juncture between the main platform and ramp 18. The position of ramp 18, flat on the ground, is the position to which it is manually adjusted by means of handle 110 and releasing lever 68 after the assembly has touched the ground. To allow the passenger in the wheelchair to dismount from the platform, ramp 18 is lowered by releasing lever 68 and grasping handle 110 and allowing the ramp to be lowered to the ground.

As seen in FIG. 5, the front platform support arms 32 and 70 are shown in their fully-extended position, as are rear support arms 34 and 72. A portion of the linking bars 56 and 78, linking the knees of the front support and rear support arms, are also shown bracketing a sheath 112, which overlies the chain drive mechanism and is slotted at 114 to provide clearance for the sprockets 66 at the exterior side of the vehicle. Horizontal track 38 and curved track 44 of the parallel bar linkage and track system are seen in FIG. 5, and, located on the opposite side of the well in which the lift mechanism is mounted, is a corresponding horizontal track 116 and a curved track 118, which are mirror images of tracks 38 and 44.

A control panel 120 for controlling the operation of the lift system is shown mounted on the exterior of the bus adjacent the doorway. As shown therein, control panel 120 includes an up button 122, a down button 124, and a stop button 126 on the right-hand side of the panel. On the left-hand side of the panel, a toggle switch 128 is provided for operating floor panels 26 and 28 as is an indicator light 130. A cover plate 132 for the control panel 120 is shown in phantom in the open position.

Figure 6:
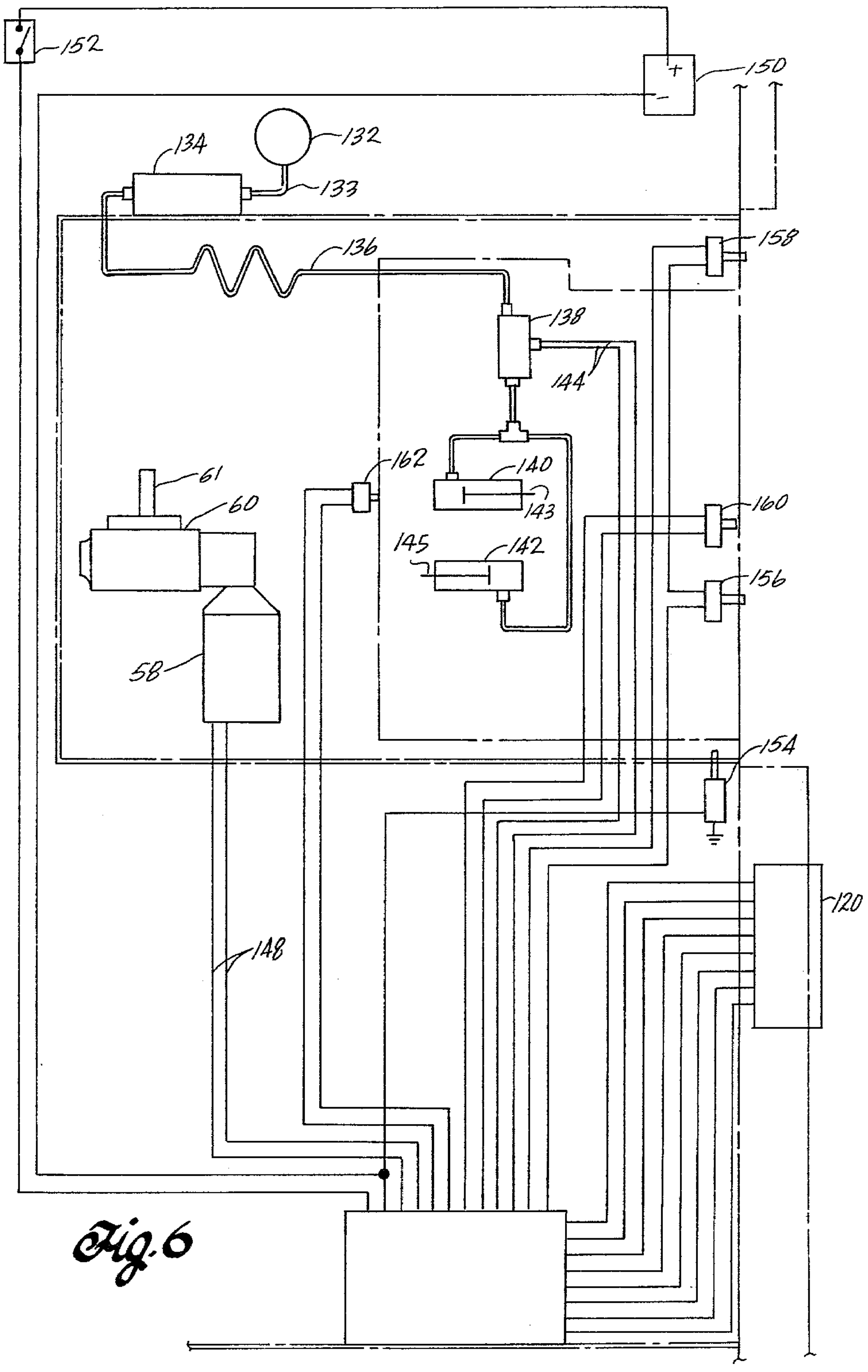
FIG. 6 is a schematic and block diagram of the electrical and pneumatic circuits of the lift system of the present invention.

The details of the electric and pneumatic circuitry of the lift system of the present invention are shown in block diagram form in FIG. 6. The invention utilizes a pneumatic air drive system for raising and lowering the wheel chocking panels 26 and 28. As shown in FIG. 6, an air line 133 connects the existing air supply 132 on the bus through a lubricator 134 and an air line 136 to a solenoid valve 138 which in turn communicates with an air cylinder 140 associated with panel 26 and an air cylinder 142 associated with panel 28. Air is admitted to cylinders 140, 142 to extend the piston shafts 143, 145 out of the cylinders to raise panels 26 and 28. When air is withdrawn the panels return to the horizontal position by gravity. Electrical connections are shown at 144 extending between a control box 146 and the solenoid valve. When the toggle switch 128 on control panel 120 is operated, a signal is transmitted through the control box to the solenoid valve to cause it to operate and air to be admitted or withdrawn from the air cylinders, thereby raising or lowering the chocking panels.

The motor 58, gearbox 60, and drive shaft 61 of the lift system are shown in phantom in FIG. 6. Electric power is supplied to motor 58 by electrical connections 148 between the motor and the control box 146. Again, depending on whether the "up" or "down" switch 122, 124 is operated, the direction of rotation of motor 58 is controlled, and likewise the extension or retraction of the lifting platform.

Th electric supply for the lift system of the present invention is obtained from the existing battery supply 150 on the bus. Power from this source is supplied through a master switch 152 located at the driver's console on the bus and thence to the control panel 146. A warning light, not shown, is also located at the driver's position to advise the driver that the door is unlatched. As can be seen from FIG. 6, when master switch 152 is operated, a door safing lock 154 is likewise operated to permit the operator to open the door to the lift assembly from the outside. Two additional sensing switches are also provided. The first is a platform ramp safing switch 156, which is connected in series with a door safing switch 158 from control box 146. The platform ramp safing switch 156 is operated by lowering ramp 18 to its vertically downward stowed position. The door safing switch 158 is operated by closing door 16. If either of these switches are not operated, a warning light (not shown) is lit at the driver's position to warn him that the platform lift system has not been securely stowed prior to getting the bus underway.

Finally, two additional sensing switches, a platform down switch 160 and a platform up switch 162, are provided. When platform 12 is moved outwardly and downwardly to lower a wheelchair or to receive a passenger located outside the vehicle, the contact of the platform with the ground operates switch 160 and automatically stops motor 58. Likewise, when the platform is retracted to its fully stowed position, the edge of platform 12 contacts the plunger of switch 162 and automatically stops motor 58.

To operate the lift system, the master switch 152 at the bus driver's console is closed. This unlocks door 16 by means of lock 154 and connects power from battery 152 to the lift drive system. The warning light located at the bus driver's console comes on when master switch 152 is operated to indicate a door-unlatched condition.

Operation of the lift system is controlled from panel 120. In tracing the operating steps, the operator first opens the door and secures it open at a position perpendicular to the bus. Movable ramp 18 is manually raised to a level, or upwardly-inclined, position, and the lift system is ready for operation. To lower a wheelchair passenger from the bus to the ground, the wheelchair is first positioned on the platform with the rear wheels between panels 26 and 28 with the passenger facing out of the bus. Switch 128 is operated to raise chocking panels 26, 28. Safing rail 20 is then manually lowered by the operator to surround the wheelchair and to provide a barrier around the well containing the lift system mechanism to the remaining passengers within the bus.

To lower the assembly, the down switch 124 is operated, and the platform descends until it is stopped automatically when it contacts the ground. The stop switch 126 provided on control panel 120 is an emergency stop only.

When platform 12 is down on the ground and stopped, chock panels 26 and 28 are released under the control of toggle 128 and air cylinders 140 and 142. The wheelchair passenger then rolls his chair off panel 24 and down ramp platform 18 to the ground. To raise passengers into the bus, a reverse of the above operation is utilized, operating up button 122 on the control panel.

What is claimed is:

1. A wheelchair lifting system comprising:

a housing including means for supporting wheelchairs therein;

guide means for the lifting system, said guide means including two pairs of tracks mounted in and secured to the housing, each pair of said tracks including a horizontal track and an arcuate track curving downwardly, each of said arcuate tracks being positioned above the horizontal track of its respective pair;

a support linkage for the lifting system mounted on the tracks of the guide means, the said linkage including two pairs of opposed, horizontally, spaced apart generally right-angle-shaped support arms and a linking bar disposed parallel to and extending between each pair of arms, said support arms defining upper and lower extremities and a knee at the location of the right angle;

a wheelchair platform mounted on and pivotally secured between the respective pairs of linking bars and support arms at the upper extremities thereof;

a roller attached to the exterior side of the knee and the lower extremities of each of the support arms, said rollers on said extremities being mounted on the horizontal tracks of the guide means and said rollers on said knees being mounted on the arcuate tracks of the guide means;

chocking means located on the wheelchair platform for bracing the wheels of a wheelchair placed on said platform; and drive means for extending and retracting the support linkage and the platform relative to said housing whereby said platform moves in an outward and downward motion during extension and in the reverse of said motion during retraction.

2. A lifting mechanism according to claim 1 wherein the chocking means are a pair of panels hingedly mounted on the platform and adapted to be flush with the top surface of the platform in the stowed position.

3. A lifting mechanism according to claim 2 including auxiliary drive means for pivotally raising and lowering the panels to define a shallow wheel-receiving channel therebetween.

4. A lifting mechanism according to claim 3 wherein the auxiliary drive means is a pneumatic air drive system.

5. A lifting mechanism according to claim 1 further comprising a ramp hingedly secured to the exterior side of the platform, said ramp being movable between a vertically stowed position, a position horizontal with the platform, and a position upwardly-inclined relative to the platform.

6. A lifting mechanism according to claim 5 including locking means for locking the ramp in each of said positions.

7. A lifting mechanism according to claim 1 wherein the drive means includes a drive motor and a chain drive linkage interconnecting the motor to the linkage means and the linkage means to the housing.

* * * * *